Patented Nov. 20, 1923.

1,474,843

UNITED STATES PATENT OFFICE.

CHARLES E. NORTH, OF MONTCLAIR, NEW JERSEY, ASSIGNOR TO THE MILK OIL CORPORATION, A CORPORATION OF DELAWARE

PROCESS OF MAKING ARTIFICIAL MILK.

No Drawing. Application filed July 14, 1922. Serial No. 575,055.

*To all whom it may concern:*

Be it known that I, CHARLES E. NORTH, a citizen of the United States of America, residing at Montclair, in the county of Essex and State of New Jersey, have invented certain new and useful Improvements in Processes of Making Artificial Milk, of which the following is a full, clear, and exact description.

At the present time, as is well known, it is customary for milk dealers to bottle the milk served to customers for hygienic reasons, and this custom is practically universal. The commercial value of the milk is dependent upon the amount of cream which rises in the jars or bottles when they are permitted to stand and this is considered by the public and consumers generally as the crucial test of the quality of the milk, the purchaser always looking for the cream line.

Recent advances in the art of preserving and treating fresh milk have led to the production of milk artificially by recombining milk fat, skim milk powder and water and this is practiced in time of scarcity, in places where the supply of natural fresh milk is limited and under other conditions, but the makers of such milk have encountered heretofore the insuperable difficulty of producing this product of such character that the cream will rise naturally in the jar or container, it having been found that when such artificially made milk is allowed to stand there is a tendency to form a hard plug as it is called at the top. This has practically precluded the making of artificial milk and its distribution to customers in bottles or jars in the manner followed with fresh milk and is the only reason for its nonproduction as the artificially produced milk may be just as sweet, pure and wholesome as any other.

It has long been known that if cold fresh milk or cream be sufficiently stirred or agitated the rising of the fat particles to the surface will be prevented or impeded, so that such stirring is carefully avoided in milk distributed in glass jars or bottles in order not to impair its commercial value by its failure to develop the cream line which the consumers have learned to look for as an indication of the amount of cream which the milk contains.

In the case of artificially produced cream the same conditions exist as with the fresh milk. Unless the cream at a temperature of 40° F. or lower be stirred or agitated for a long period, about an hour or more, there will form on a body of it confined in a bottle or jar a plug of hard fat with sometimes a layer of yellow oil on the surface. When properly agitated, however, the fat particles will not rise to the surface even after standing for twenty-four hours and the characteristic plug of hard fat and oil will not form. What is true of artificially produced cream is true also of artificially produced milk but dealers do not stir or agitate such milk to prevent the formation of the plug of hard fat and oil because the avoidance of this, means the absence of the cream line and this impairs the commercial value of the product in the eyes of consumers.

I have sought to remedy and remove this objection to artificially produced milk and I have discovered the process of producing such milk which forms the subject of my present application for Letters Patent, and by which I am now able to produce artificial milk which exhibits all of the essential characteristics of natural fresh milk, in that the cream rises to the top and forms a well defined cream line, the position of which depends upon the proportion of the milk oil which is used in its manufacture.

In carrying out this, my invention, I proceed as follows—I first produce artificially cream following the known method of emulsifying milk fat or milk oil with water and skim milk powder or milk fat with ordinary skim milk using proportions of these ingredients which produce cream containing butter fat in the percentage found in ordinary commercial cream. This cream is then chilled to a temperature of 40° F. or less and agitated slowly, as by a revolving coil in a tank, or by the paddles commonly used for the agitation of condensed milk or cream. This stirring or agitation should be continued for an hour or even longer until the cream reaches a condition in which, on standing, the fat will not rise to form a hard plug or layer of oil on the surface.

I next produce artificial skim milk by dissolving soluble dried skim milk powder in water or if it be at hand I may use natural skim milk. This product is then chilled to a temperature of 40° F. or less.

The third step in the process is to combine the artificial and agitated cream with the artificially produced or natural skim milk in proportions to produce a milk containing the amount of butter fat commonly found in natural commercial milk. For this purpose the cream is added to the skim milk in any suitable tank or vat and the mixture then gently stirred or agitated by a revolving coil or paddles until the two products are thoroughly mixed. Care should be taken that this agitation is not so prolonged nor so violent as to prevent the cream from rising in the ordinary and natural way to the top of the mixture. In fact, the mixing of the two products is momentarily only the agitation being sufficient merely to produce a uniform mixture, which should be accomplished in a minute or two.

This mixture of cream and milk may then be bottled or canned in the usual way. If permitted to stand the cream will rise to the top naturally and no plug of hard fat will be formed and no oil will rise to the surface. Thus artificial milk practically undistinguishable from fresh natural milk, may be produced and marketed in the customary manner which under many circumstances is a most important and desirable thing.

What I claim as my invention is—

1. The process herein described of producing milk artificially, which consists in emulsifying butter fat or milk oil, water and skim milk powder to produce cream, agitating the same until it is brought to a condition in which no plug of hard fat forms thereon on standing and then mixing the agitated cream with skim milk.

2. The process herein described of producing milk artificially, which consists in emulsifying butter fat or milk oil, water and dried skim milk powder to produce cream, agitating or stirring the same until it is brought to a condition in which no plug of hard fat forms thereon on standing, mixing water and dried skim milk powder and combining and mixing the two products.

3. The process herein described of producing milk artificially, which consists in emulsifying butter fat or milk oil, water and skim milk powder to produce cream, chilling the same to a temperature of about 40° F., agitating the chilled product until it is brought to a condition in which no plug of hard fat forms thereon, on standing, separately mixing water and skim milk powder, chilling the same to a like temperature and thoroughly mixing the same with the agitated cream in proportions to form milk having the butter fat content desired.

In testimony whereof I hereto affix my signature.

CHARLES E. NORTH.